(12) United States Patent
Markman et al.

(10) Patent No.: US 7,567,298 B2
(45) Date of Patent: Jul. 28, 2009

(54) APPARATUS AND METHOD FOR DETECTING NTSC CO-CHANNEL INTERFERENCE

(75) Inventors: Ivonete Markman, Carmel, IN (US); Gabriel Alfred Edde, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 787 days.

(21) Appl. No.: 10/535,979

(22) PCT Filed: Nov. 12, 2003

(86) PCT No.: PCT/US03/35921

§ 371 (c)(1),
(2), (4) Date: May 24, 2005

(87) PCT Pub. No.: WO2004/049699

PCT Pub. Date: Jun. 10, 2004

(65) Prior Publication Data

US 2006/0092330 A1     May 4, 2006

Related U.S. Application Data

(60) Provisional application No. 60/429,366, filed on Nov. 26, 2002.

(51) Int. Cl.
*H04N 5/21*     (2006.01)
(52) U.S. Cl. .................. 348/607; 348/614; 348/21
(58) Field of Classification Search ............ 348/607, 348/624, 21, 725, 731, 611, 612, 614, 533, 348/536, 537; 725/100, 131; 375/326, 346, 375/350, 327; H04N 5/21, 5/44, 5/08
See application file for complete search history.

(56) References Cited

U.S. PATENT DOCUMENTS 5,325,204 A * 6/1994 Scarpa ...................... 348/607

(Continued)

FOREIGN PATENT DOCUMENTS

WO    WO 98/14005      4/1998

(Continued)

OTHER PUBLICATIONS

C. Scarpa: "A Recursive NTSC Canceler to Reduce CA-Channel Interference into HDTV Broadcasts", IEEE Transactions on Consumer Electronics, IEEE Inc., New York, US, vol. 39, No. 3, Aug. 1, 1993, pp. 696-703.

(Continued)

*Primary Examiner*—Sherrie Hsia
(74) *Attorney, Agent, or Firm*—Robert D. Shedd; Joseph J. Opalach

(57) ABSTRACT

A television set includes an ATSC (Advanced Television Systems Committee) receiver, which includes an NTSC (National Television Systems Committee) co-channel interference detector based on carrier tracking of the NTSC video carrier signal. The NTSC co-channel interference detector includes a carrier tracking loop and a decision device. The carrier tracking loop processes a received signal for detecting the possible presence of the NTSC video carrier signal and for providing a tracking signal representative thereof. The decision device receives the tracking signal and recovers a DC offset therefrom. The decision device then determines that NTSC co-channel interference is present if the DC offset signal is greater than a predefined threshold.

17 Claims, 10 Drawing Sheets

U.S. PATENT DOCUMENTS

| | | | | |
|---|---|---|---|---|
| 5,400,084 | A | * | 3/1995 | Scarpa ........................ 348/624 |
| 5,828,705 | A | * | 10/1998 | Kroeger et al. .............. 375/326 |
| 6,233,295 | B1 | | 5/2001 | Wang |
| 6,697,098 | B1 | | 2/2004 | Wang |
| 7,031,405 | B1 | * | 4/2006 | Touzni et al. ............... 375/326 |
| 2002/0176022 | A1 | | 11/2002 | Ahn |

FOREIGN PATENT DOCUMENTS

| WO | WO 99/23816 | 5/1999 |
|---|---|---|

OTHER PUBLICATIONS

U.S. Advanced Television Systems Committee, "ATSC Digital Television Standard", Document A/53, Sep. 16, 1995, pp. 1-74.

United States Advanced Television Systems Committee, "Guide to the Use of the ATSC Digital Television Standard", Document A/54, Oct. 4, 1995, pp. 1-148.

Search Report Dated Aug. 26, 2004.

* cited by examiner

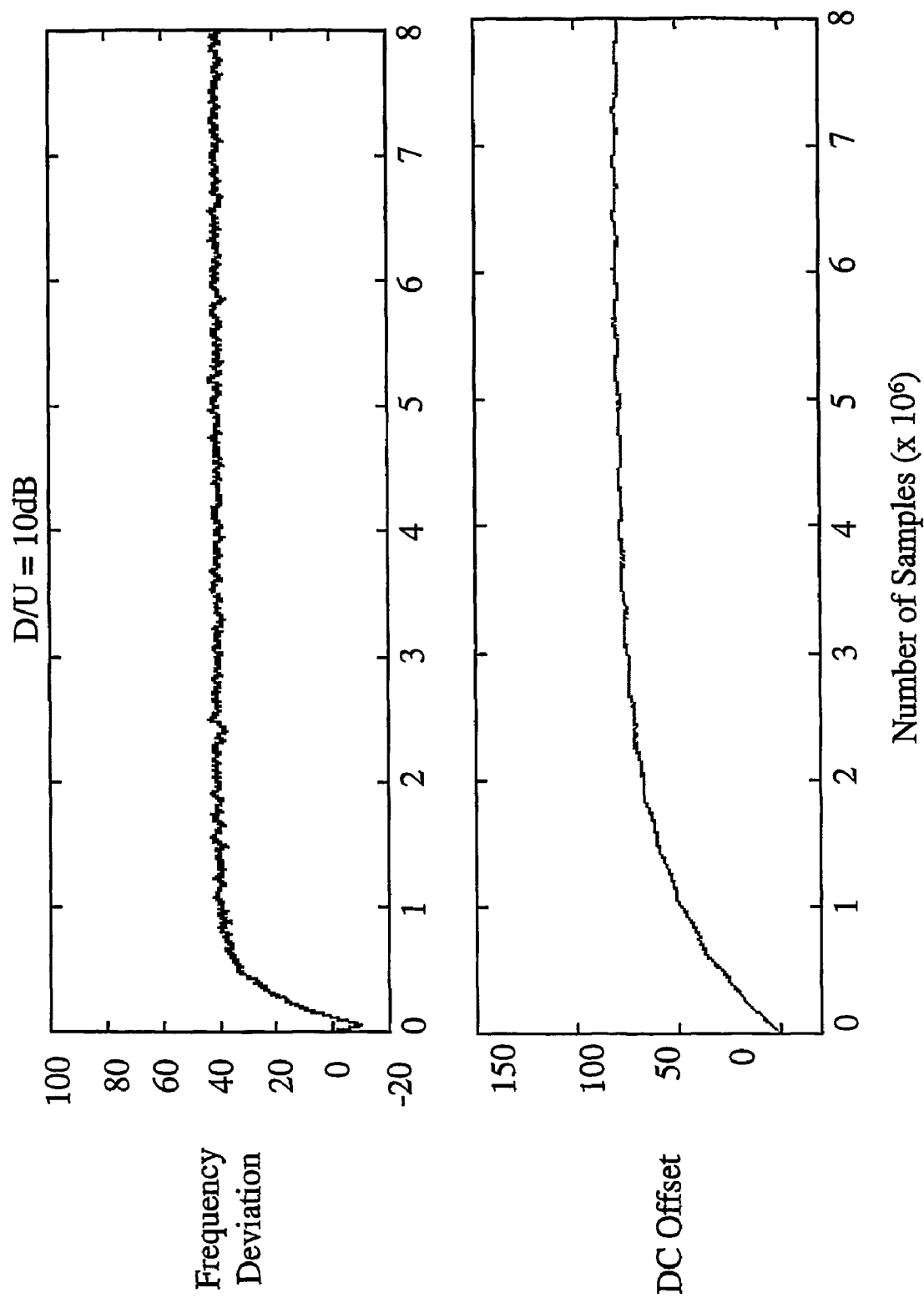

FIG. 8     Table 1

| D/U (dB) | CTL Convergence | DC offset |
|---|---|---|
| 5 | yes | 134 |
| 10 | yes | 80 |
| 15 | yes | 45 |
| 18 | yes | 31 |
| 20 | yes | 25 |
| 25 | no | 0 |
| ∞ (VSB only) | no | 0 |

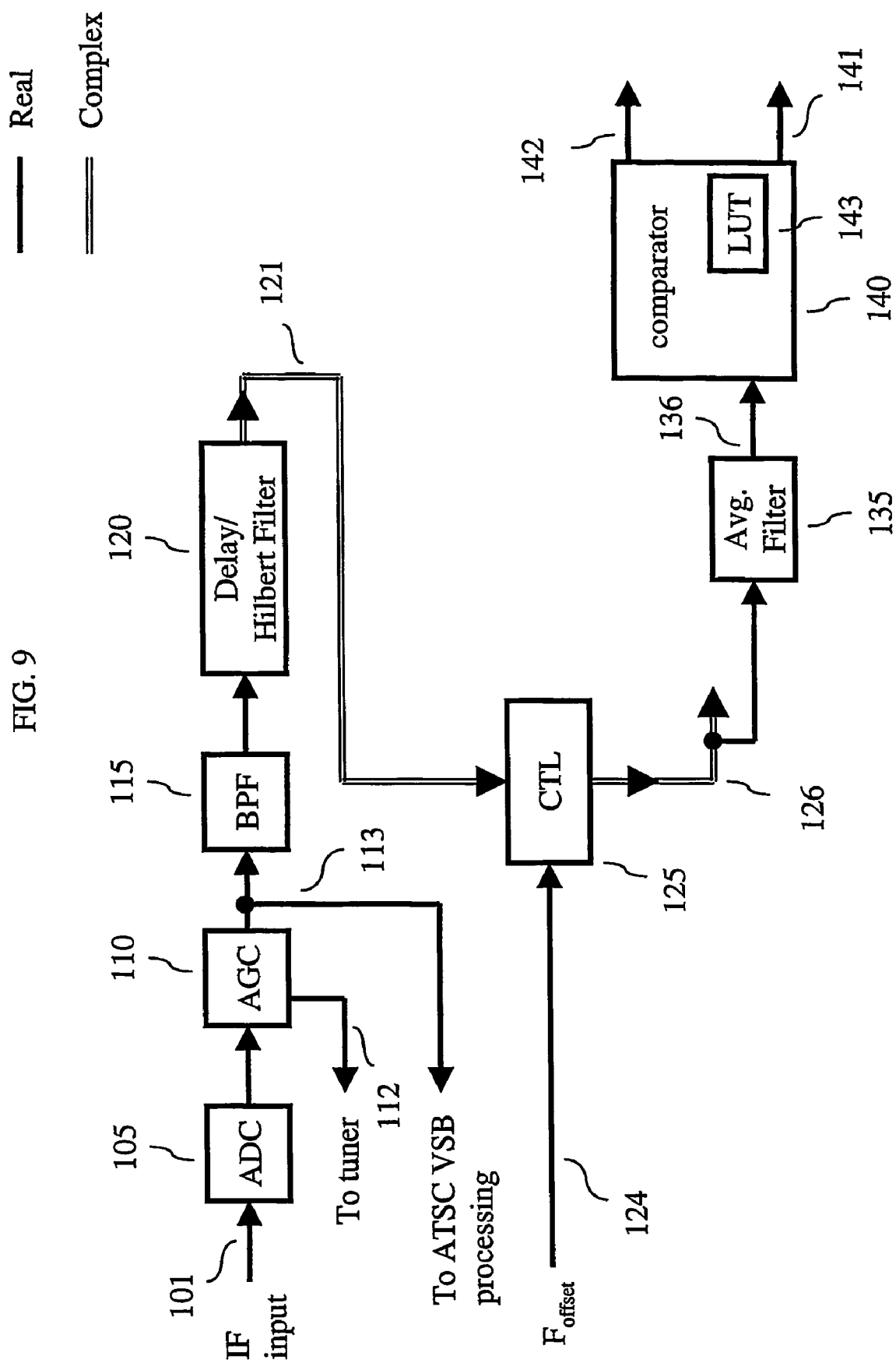

APPARATUS AND METHOD FOR DETECTING NTSC CO-CHANNEL INTERFERENCE

This application is a national phase application and claims the benefit, under 35 U.S.C. § 365 of International Application PCT/US03/35921, filed Nov. 12, 2003, which was published in accordance with PCT Article 21(2) on Jun. 10, 2004 in English and which claims the benefit of U.S. provisional patent application No. 60/429,366, filed Nov. 26, 2002.

BACKGROUND OF THE INVENTION

The present invention generally relates to communications systems and, more particularly, to an interference detector in a receiver.

During the transition from analog to digital terrestrial television in the United States, both analog NTSC (National Television Systems Committee) based transmissions and digital ATSC-HDTV (Advanced Television Systems Committee-High Definition Television) based transmissions are expected to co-exist for a number of years. As such, an NTSC broadcast signal and an ATSC broadcast signal may share the same 6 MHz wide (millions of hertz) channel. This is illustrated in FIG. 1, which shows the relative spectral positions of the NTSC signal carriers (video, audio and chroma) with respect to the digital VSB (Vestigial Sideband) ATSC signal spectrum. Thus, an ATSC receiver must be able to efficiently detect and reject NTSC co-channel interference.

In an ATSC-HDTV digital receiver, NTSC co-channel interference rejection may be performed by the comb filter (e.g., see, United States Advanced Television Systems Committee, "ATSC Digital Television Standard", Document A/53, Sep. 16, 1995). The comb filter is a 12 symbol linear feed-forward filter with spectral nulls at or near the NTSC signal carriers, and is only applied when NTSC interference is detected (e.g., see, United States Advanced Television Systems Committee, "Guide to the Use of the ATSC Digital Television Standard", Document A/54, Oct. 4, 1995). Tests have shown that the comb filter performs efficient NTSC signal rejection for D/U (Desired-to-Undesired) signal power ratios up to 16 dB (decibels). The D/U signal power ratio is defined as the average digital VSB ATSC signal power divided by the average NTSC peak signal power.

Since the comb filter is only applied when NTSC interference is detected, it is necessary to first detect the presence of NTSC co-channel interference. Further, it is desirable to be able to detect the NTSC co-channel interference in high D/U ratios. The above-mentioned "Guide to the Use of the ATSC Digital Television Standard," describes an implementation of an NTSC detector that uses the power difference between the input signal and the output signal of the comb filter. In particular, this implementation detects that an NTSC co-channel signal is present when there is a substantial difference in power between the input signal and the output signal of the comb filter. Unfortunately, this design is not reliable for D/U ratios above 10 dB.

SUMMARY OF THE INVENTION

In accordance with the principles of the invention, a co-channel interference detector includes a carrier tracking loop for processing a received signal to provide a tracking signal indicative of a possible presence of at least one carrier of an interfering signal and a decision device for determining if the interfering signal is present as a function of the tracking signal.

In an embodiment of the invention, a television set includes an ATSC receiver, which includes an NTSC co-channel interference detector based on carrier tracking of the NTSC video carrier signal. The NTSC co-channel interference detector includes a carrier tracking loop and a decision device. The carrier tracking loop processes a received signal for detecting the possible presence of the NTSC video carrier signal and for providing a tracking signal representative thereof. The decision device receives the tracking signal and recovers a DC offset therefrom. The decision device then determines that NTSC co-channel interference is present if the DC offset signal is greater than a predefined threshold.

BRIEF DESCRIPTION OF THE DRAWINGS

FIGS. 7 and 8 show illustrative simulation results; and

FIGS. 9-10 show other embodiments in accordance with the principles of the invention.

DETAILED DESCRIPTION

Other than the inventive concept, the elements shown in the figures are well known and will not be described in detail. For example, other than the inventive concept, a television, and the components thereof, such as a front-end, Hilbert filter, carrier tracking loop, video processor, remote control, etc., are well known and not described in detail herein. In addition, the inventive concept may be implemented using conventional programming techniques, which, as such, will not be described herein. Finally, like-numbers on the figures represent similar elements.

Figure 1:
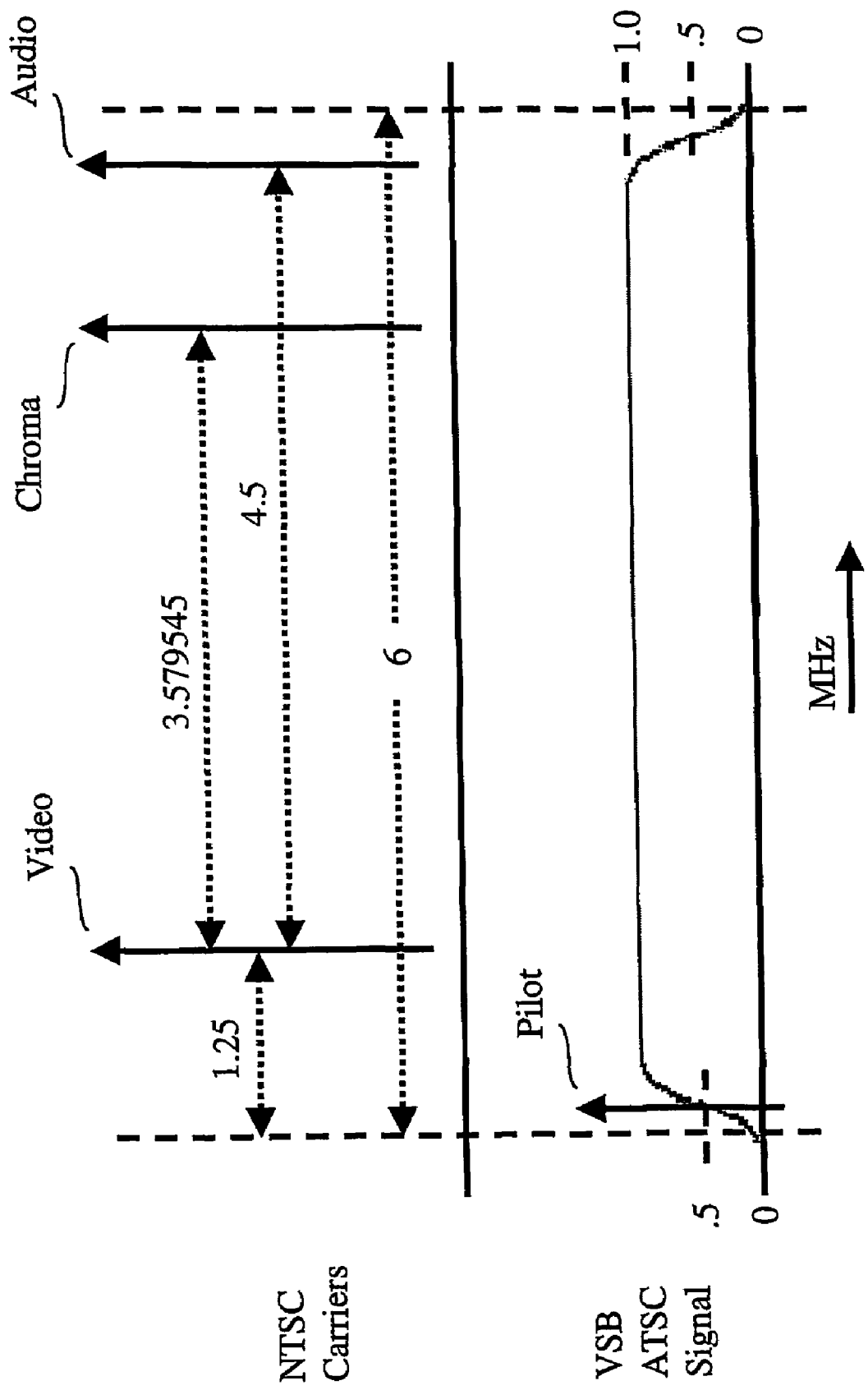
FIG. 1 shows a comparison of an NTSC signal spectrum and a ATSC signal spectrum.
Figure 2:
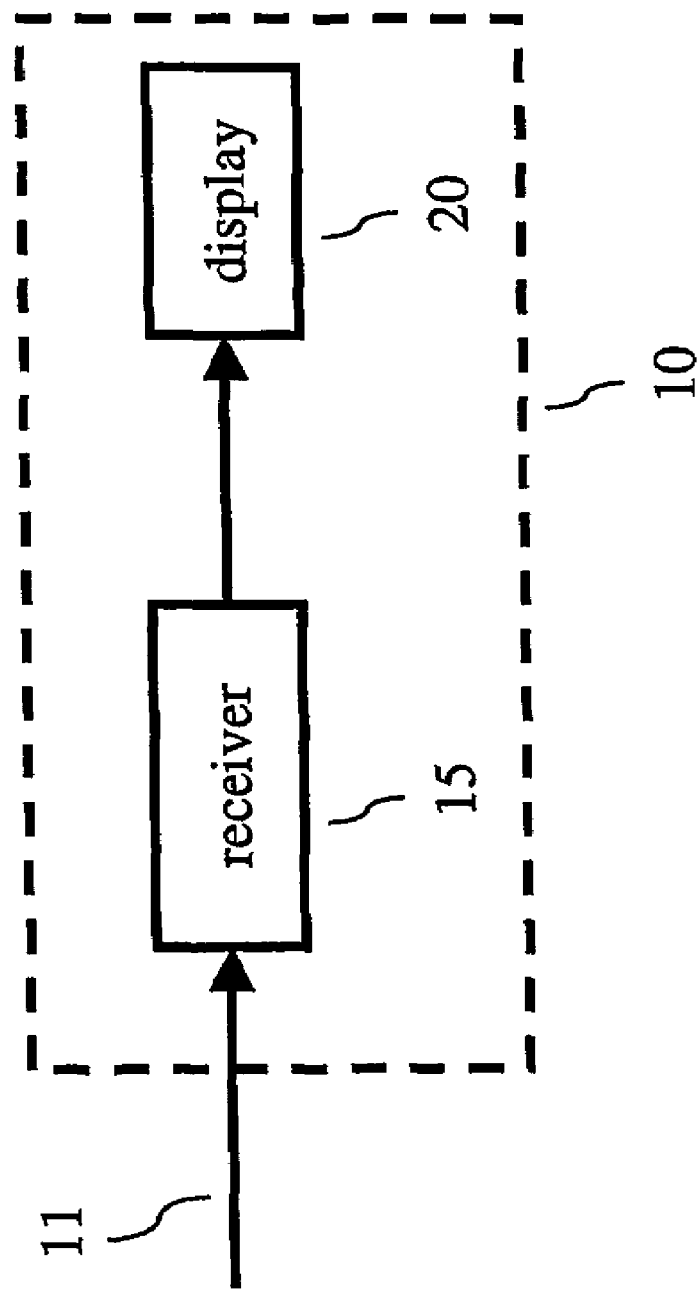
FIG. 2 shows an illustrative high-level block diagram of a TV set embodying the principles of the invention.

A high-level block diagram of an illustrative television set 10 in accordance with the principles of the invention is shown in FIG. 2. Television (TV) set 10 includes a receiver 15 and a display 20. Illustratively, receiver 15 is an ATSC-compatible receiver. It should be noted that receiver 15 may also be NTSC-compatible, i.e., have an NTSC mode of operation and an ATSC mode of operation such that TV set 10 is capable of displaying video content from an NTSC broadcast or an ATSC broadcast. However, in the context of this description, the ATSC mode of operation is described. Receiver 15 receives a broadcast signal 11 (e.g., via an antenna (not shown)) for processing to recover therefrom, e.g., an HDTV video signal for application to display 20 for viewing video content thereon. As noted above, and shown in FIG. 1, signal 11 may include not only a broadcast ATSC signal but also interference from a co-channel broadcast NTSC signal. In this regard, receiver 15 of FIG. 2 includes a rejection filter (not shown), such as the above-mentioned comb filter, for removing the NTSC signal interference as described above and, in accordance with the principles of the invention, also includes an NTSC co-channel interference detector based on carrier tracking of the NTSC video carrier signal. As described further below, upon detection of NTSC co-channel interference, the NTSC co-channel interference detector enables use of the rejection filter for the processing of signal 11 for mitigation of the NTSC co-channel interference.

Figure 3:
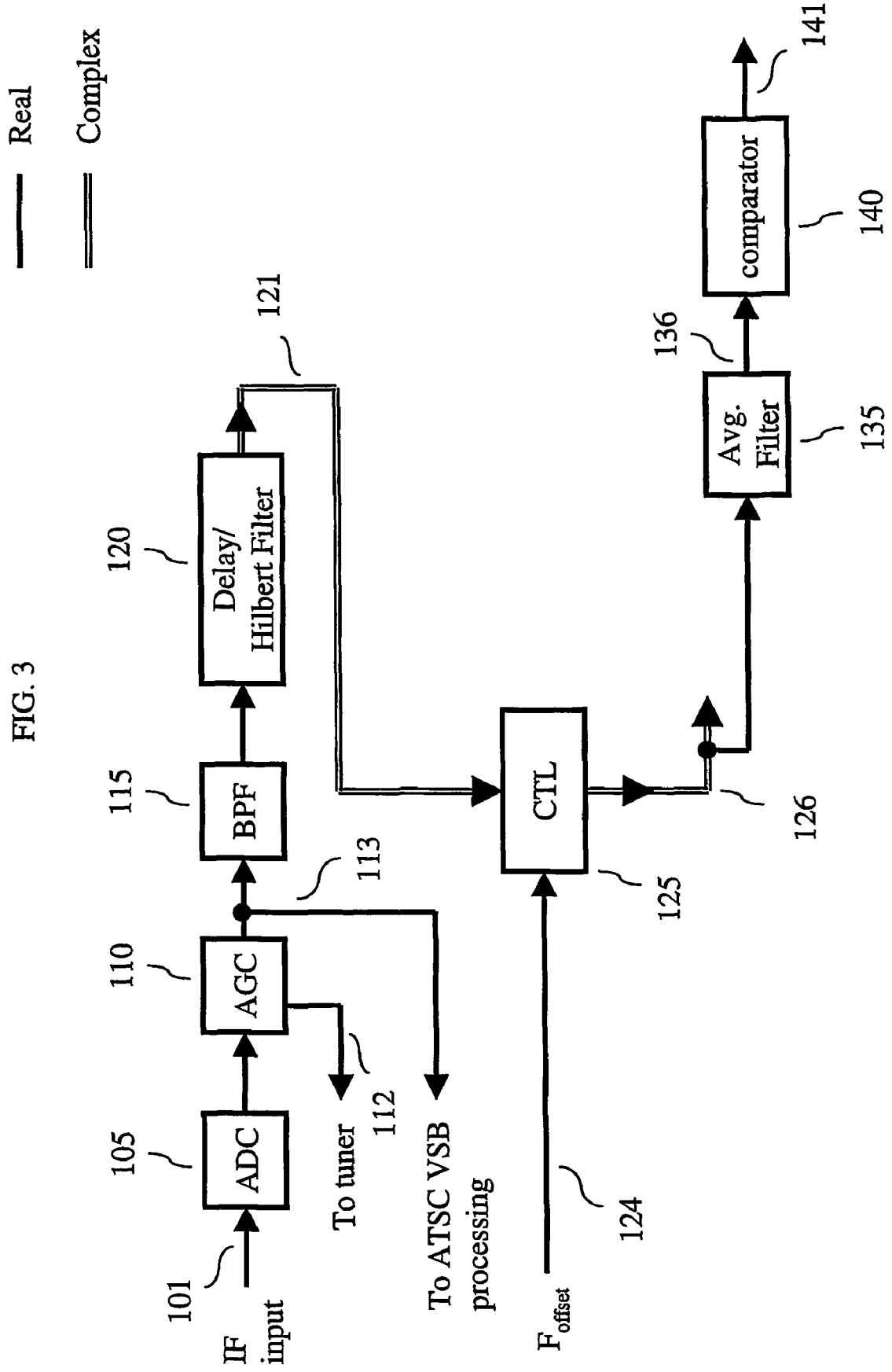
FIG. 3 shows a portion of a receiver embodying the principles of the invention.

Turning now to FIG. 3, that relevant portion of receiver 15 including an NTSC co-channel interference detector in accordance with the principles of the invention is shown. In particular, receiver 15 includes analog-to-digital converter (ADC) 105, automatic gain control (AGC) 110, band-pass filter (BPF) 115, delay/Hilbert filter element 120, carrier tracking loop (CTL) 125, averaging (avg.) filter 135 and comparator 140.

Input signal 101 represents a digital VSB modulated signal in accordance with the above-mentioned "ATSC Digital Television Standard" and is centered at a specific IF (Intermediate Frequency) of $f_{IF}$ Hertz. However, as also noted above, input signal 101 may also contain NTSC co-channel interference. Input signal 101 is sampled by ADC 105 for conversion to a sampled signal, which is then gain controlled by AGC 110. The latter is noncoherent and is a mixed mode (analog and digital) loop that provides a first level of gain control (prior to carrier tracking), symbol timing and sync detection of the VSB signal included within signal 101. AGC 110 basically compares the absolute values of the sampled signal from ADC 105 against a predetermined threshold, accumulates the error and feeds that information, via signal 112, back to the tuner (not shown) for gain control prior to ADC 105. As such, AGC 110 provides a gain controlled signal 113 to ATSC VSB processing circuitry (not shown) and to BPF 115. In accordance with a feature of the invention, BPF 115 is centered at the NTSC video carrier and has a narrow bandwidth less than or equal to 600 KHz (thousands of hertz). Assuming no transmitted offsets between the VSB signal and a co-channel NTSC signal, and assuming high side injection, the NTSC video carrier is expected to be at a frequency, $f_{VIDEO}$, where $f_{VIDEO} = f_{IF} - 1.75$ MHz.

The output signal from BPF 115 is then passed through delay/Hilbert filter element 120. The latter includes a Hilbert filter and an equivalent delay line that matches the Hilbert filter processing delay. As known in the art, a Hilbert Filter is an all-pass filter that introduces a −90° phase shift to all input frequencies greater than 0 (and a +90° degree phase shift to negative frequencies). The Hilbert filter allows recovery of the quadrature component of the output signal from BPF 115. In order for the CTL to correct the phase and lock to the NTSC video carrier both the in-phase and quadrature components of the signal are needed.

The output signal 121 from delay/Hilbert filter element 120 is a complex sample stream comprising in-phase (I) and quadrature (Q) components. It should be noted that complex signal paths are shown as double lines in the figures. Signal 121 is applied to carrier tracking loop (CTL) 125, which is a phase locked loop that processes the complex sample stream of signal 121 to down convert the IF signal to baseband and correct for frequency offsets between the transmitter (not shown) of the broadcast NTSC video carrier and the receiver tuner Local Oscillator (not shown). CTL 125 is a second order loop, which, in theory, allows for frequency offsets to be tracked with no phase error. In practice, phase error is a function of the loop bandwidth, input phase noise, thermal noise and implementation constraints like bit size of the data, integrators and gain multipliers.

Figure 4:
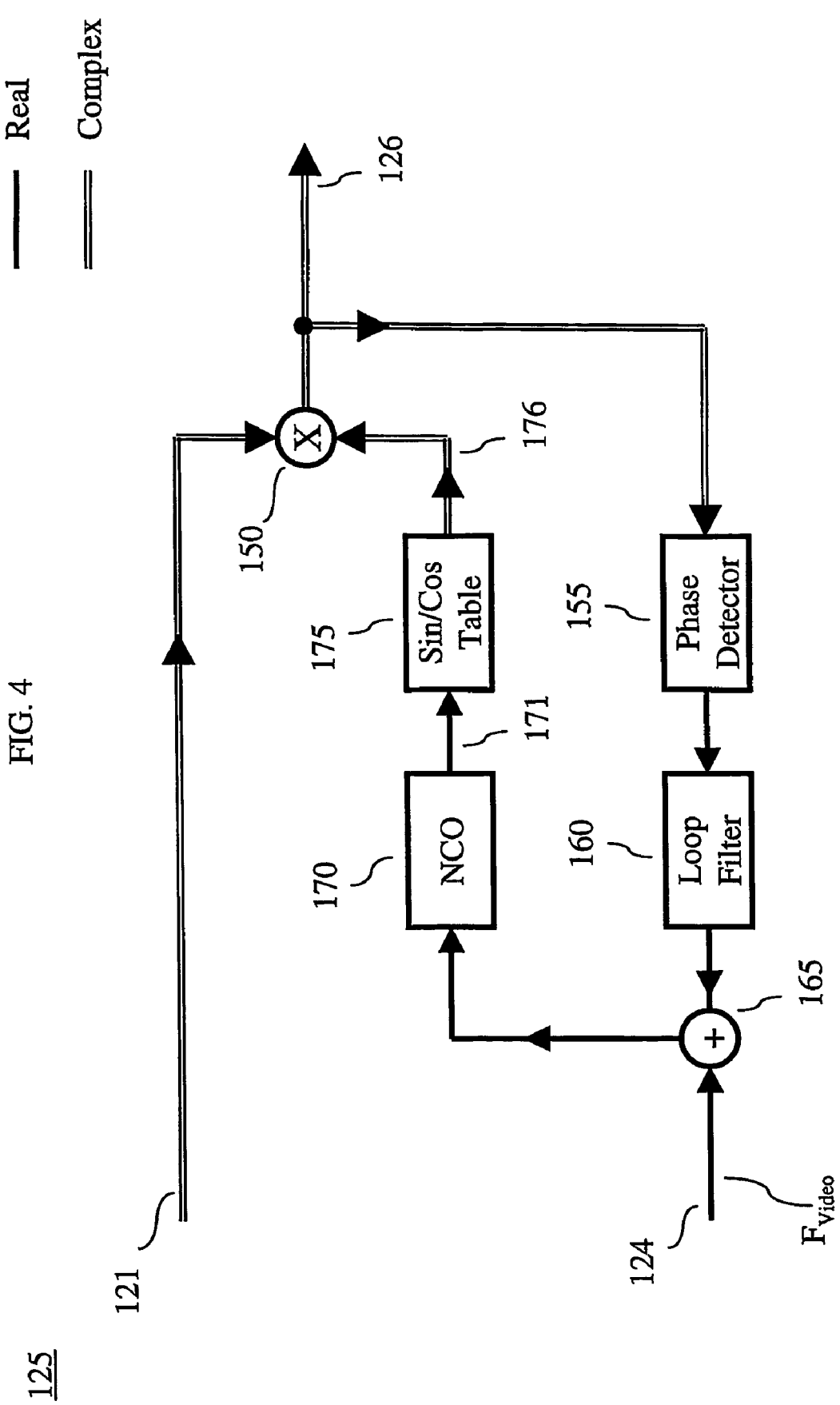
FIG. 4 shows an illustrative carrier tracking loop for use in the receiver of FIG. 3.

Turning for the moment to FIG. 4, an illustrative embodiment of CTL 125 is shown. CTL 125 includes complex multiplier 150, phase detector 155, loop filter 160, combiner (or adder) 165, numerically controlled oscillator (NCO) 170 and sine/cosine (sin/cos) table 175. It should be noted that other carrier tracking loop designs are possible, as long as they achieve the same performance. Complex multiplier 150 receives the complex sample stream of signal 121 and performs de-rotation of the complex sample stream by a calculated phase angle. In particular, the in-phase and quadrature components of signal 121 are rotated by a phase. The latter is provided by signal 176, which represents particular sine and cosine values provided by sin/cos table 175 (described below). The output signal from complex multiplier 150, and for that matter CTL 125, is signal 126, which represents a de-rotated complex sample stream. Signal 126 is also referred to herein as the tracking signal. As can be observed from FIG. 4, tracking signal 126 is also applied to phase detector 155, which computes any phase offset still present in the tracking signal 126 and provides a phase offset signal indicative thereof. This computation can be performed with a "I*Q" or a "sign(I)*Q" function. The phase offset signal provided by phase detector 155 is applied to loop filter 160, which is a first order filter with proportional-plus-integral gains. Ignoring for the moment combiner 165, the loop filtered output signal from loop filter 160 is applied to NCO 170. The latter is an integrator, which takes as an input signal a frequency, and provides an output signal representative of phase angles associated with the input frequency. However, in order to increase the acquisition speed, the NCO is fed a frequency offset, $F_{OFFSET}$, corresponding to $f_{VIDEO}$, which is added to the loop filter output signal via combiner 165 to provide a combined signal to NCO 170. NCO 170 provides an output phase angle signal 171 to sin/cos table 175, which provides the associated sine and cosine values to complex multiplier 150 for de-rotation of the CTL input signal 121 to provide tracking signal 126.

Returning now to FIG. 3, when NTSC co-channel interference is present in the received signal 11 of FIG. 2, tracking signal 126 includes a DC offset at baseband that is proportional to the power level of the received NTSC video carrier. The sign of this DC offset depends on possible 180° ambiguity of the carrier tracking loop, which depends on the carrier tracking loop implementation. As shown in FIG. 3, the in-phase (real) component of tracking signal 126 is applied to avg. filter 135, which is a low pass filter (LPF) with low bandwidth, e.g., 100 Hz (Hertz). In accordance with a feature of the invention, avg. filter 135 averages the in-phase component of tracking signal 126 in the digital domain to provide signal 136, which represents the DC offset, i.e., an average DC measure of the possible presence of NTSC co-channel interference. As such, signal 136 should be independent of the presence of additive white Gaussian noise (AWGN), phase noise and the VSB signal, since they average out to zero. It should be noted that if the NTSC video carrier is not present in the received signal 11, or if the NTSC video carrier power level is too low such that CTL 125 does not converge, the average DC value of signal 136 is zero.

Figure 5:
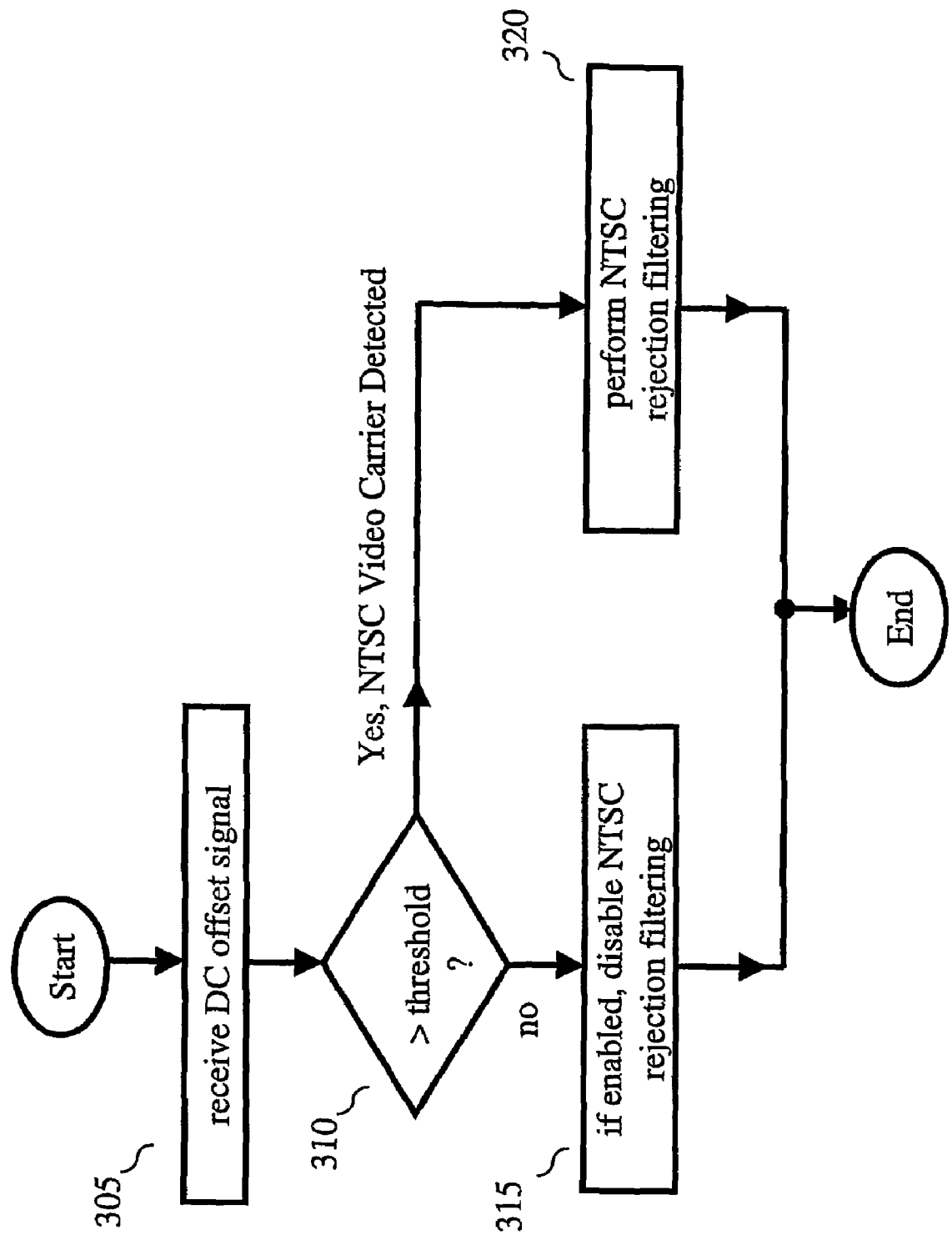
FIG. 5 shows an illustrative method in accordance with the principles of the invention.

A determination of the presence of NTSC co-channel interference is performed by comparator 140, which provides output flag signal 141. Reference at this time should also be made to FIG. 5, which shows an illustrative flow chart in accordance with the principles of the invention. In particular, signal 136, which also represents the possible detection of the NTSC video carrier signal, is applied to comparator 140 (step 305, FIG. 5). The latter compares the value of signal 136 to a predetermined positive threshold value (step 310, FIG. 5). If the absolute value of the DC offset is greater than the predetermined threshold, comparator 140 sets output flag signal 141 to a predetermined value, e.g., a value associated with a logical "ONE," which represents detection of the NTSC video carrier, i.e., detection of co-channel interference. The output flag signal is then used by other circuitry (not shown) to enable suitable NTSC rejection filtering, as described earlier (step 320, FIG. 5). However, if the absolute value of the DC offset is not greater than the predetermined threshold, then output flag signal 141 is set to a value associated with a logical "ZERO," which represents no co-channel interference. In this case, the output flag signal may also be used to disable NTSC rejection filtering if such was previously enabled (step 315, FIG. 5). Thus, and in accordance with the principles of the invention, if a signal indicative of the NTSC video carrier is detected, then receiver 15 of TV set 10 provides for suitable NTSC rejection filtering, e.g., via a comb filter as described above.

Figure 6:
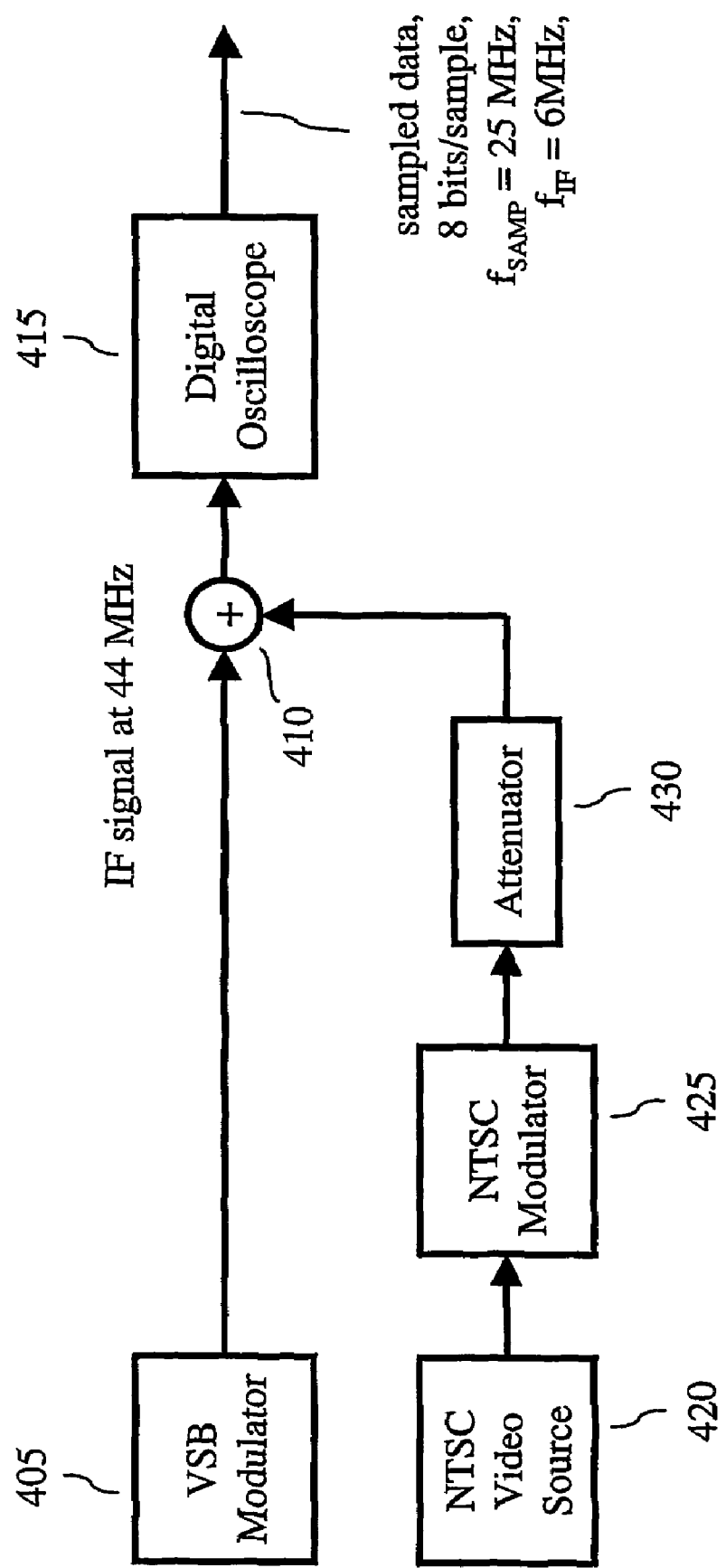
FIG. 6 shows an illustrative simulator configuration.

A simulation of the above described embodiment subsequent to ADC 110 was performed by a program written in the C programming language. This program processed different input data files, each data file representing an ATSC signal with added NTSC co-channel interference at a specific D/U ratio. The different data files were obtained using the simulator configuration shown in FIG. 6. An NTSC video source 420 provides an NTSC signal to NTSC modulator 425. The latter provides an NTSC transmission signal carrying the NTSC video to attenuator 430, which is used to vary the power level of the NTSC transmission signal for obtaining different D/U ratios. The attenuated NTSC transmission signal is provided to combiner 410, which adds the attenuated NTSC transmission signal to an ATSC signal provided by VSB modulator 405, which was set to a Pseudo-Noise (PN) mode. Both the NTSC transmission signal and the ATSC signal are centered at an IF of 44 MHz. The combined signal—the ATSC signal along with the co-channel NTSC interference signal—is applied to a digital oscilloscope 415. In particular, digital oscilloscope 415 samples the combined signal at a sampling rate of $f_{SAMP}$=25 Msamples/sec (millions of samples per second) and 8 bits/sample, which results in a sampled high-injection signal centered at an IF of $f_{IF}$=6 MHz. Other sampling rates and intermediate frequencies could also be used.

Some results of this simulation are shown in FIGS. 7 and 8. FIG. 7 shows illustrative graphs for a D/U ratio of 10 dB. In particular, FIG. 7 shows graphs of CTL frequency deviation and DC offset at the averaging filter output versus the number of samples. Both curves show a stable convergence of the carrier tracking loop and the DC offset, respectively.

Turning now to FIG. 8, table 1 shows the simulation results for several D/U ratios, specifying the corresponding absolute value of the DC offset at the output of the averaging filter and the carrier tracking loop convergence status. From table 1, it can be observed that the carrier tracking loop efficiently detects co-channel NTSC interference up to a D/U of about 20 dB. The entries of table 1 can also be used to provide illustrative threshold values for use in comparator 140 of FIG. 3. For example, if a threshold value is set at 31, then the decision device (e.g., comparator 140 of FIG. 3) identifies the presence of NTSC for D/U below 18 dB.

In accordance with a feature of the invention, the entries of table 1 (or similar entries) can also be stored a priori in a memory (not shown) of receiver 15 to provide an estimate of the corresponding D/U ratio for a particular DC offset. One such illustrative embodiment is shown in FIG. 9, which is similar to the embodiment shown in FIG. 3 except that comparator 140 includes a look-up-table (LUT) 143 and also provides an output signal 142. The latter is an estimate of the corresponding D/U ratio for a particular value of DC offset provided by signal 136 and, as such, is an indication of how bad the NTSC interference is. Illustratively, LUT 143 of comparator 140 stores a table corresponding to, e.g., the "D/U (dB)" and "DC offset" columns of table 1 of FIG. 8. Comparator 140 quantizes the DC offset represented by signal 136 into one of the predefined DC offsets of Table 1 and provides the corresponding D/U ratio entry as an estimate of the D/U ratio on signal 142.

As described above, an NTSC co-channel interference detector is based on carrier tracking of the NTSC video carrier. Such a co-channel interference detector is able to efficiently detect a co-channel NTSC signal up to the very high D/U ratio of about 20 dB. It should be noted that this same detector can also be employed to track the NTSC audio or chroma carrier, although it is not expected to be as efficient, due to the smaller power of these carriers compared to the video carrier. However, these alternate detectors would be useful for special cases when multipath propagation in the terrestrial channel produces a spectral null on the NTSC video carrier frequency, affecting its detection, but leaving the other carriers intact.

Figure 10:
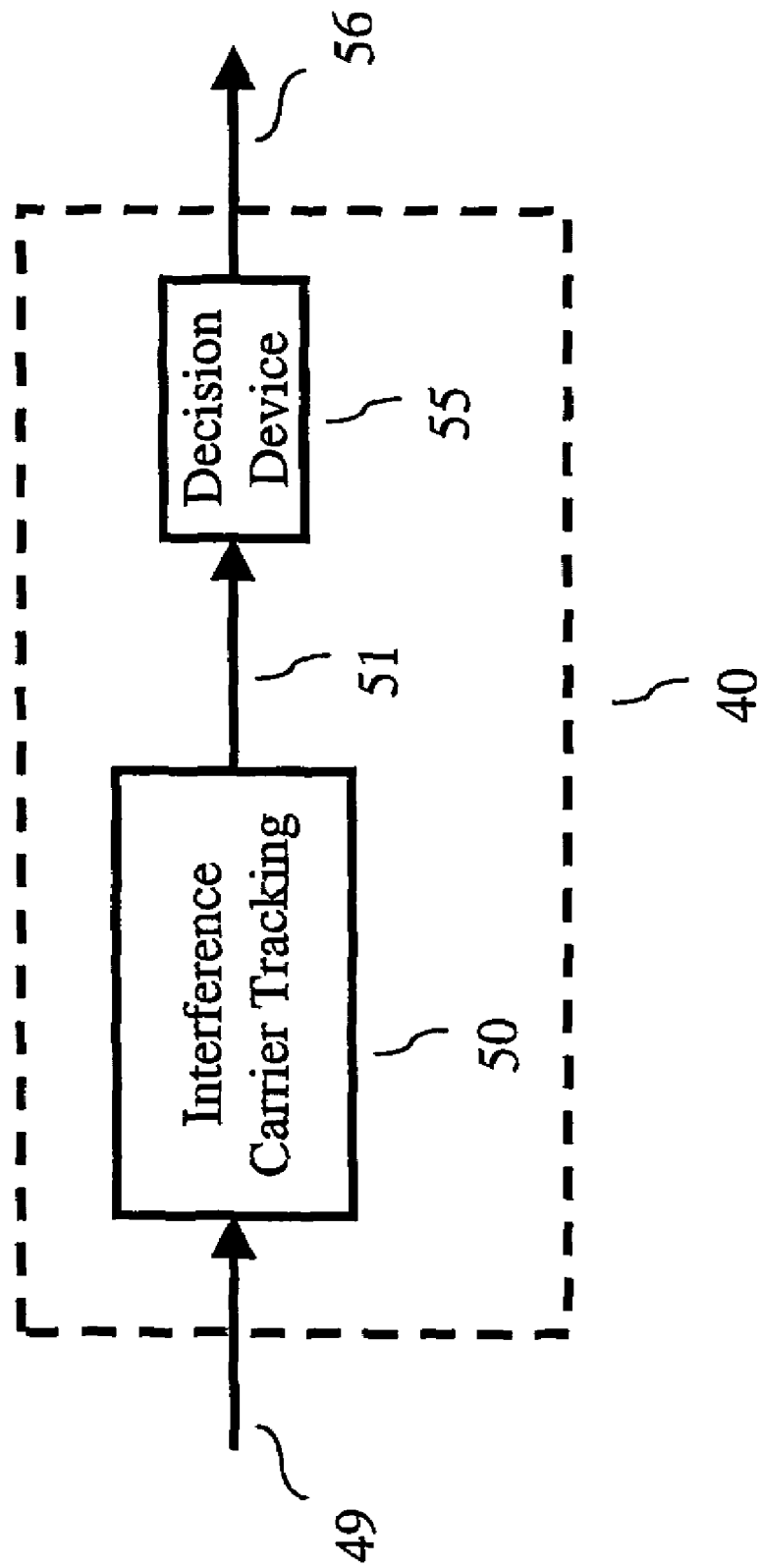

Although the inventive concept was described above in the context of a television receiver and NTSC co-channel interference, the inventive concept is not so limited and applies to any receiver that operates in the presence of one or more co-channel interfering signals. Turning now to FIG. 10, another embodiment in accordance with the principles of the invention is shown. A co-channel interference detector 40 includes interference carrier tracking element 50 and decision device 55. A received signal 49 is applied to interference carrier tracking element 50, which provides an output signal 51 proportional to the possible presence of at least one carrier (an interfering carrier) of an interfering signal present in received signal 49. Decision device 55 receives the output signal 51 and determines if the interfering signal is present as a function of a parameter of output signal 51, e.g., voltage level, frequency, phase, etc. Decision device 55 may also further process output signal 51 before determining whether the interfering signal is present. For example, and as described above with respect to FIG. 3, decision device 55 may first perform an averaging of output signal 51. Alternatively, or in addition to, decision device 55 may also calculate other statistical parameters, such as the standard deviation, etc. Illustratively, carrier tracking element 50 and decision device 55 may include elements similar to those shown and described above with respect to FIGS. 3 and 4 but are not so limited. It should also be noted that groupings of components for particular elements described and shown herein are merely illustrative. For example, although FIG. 3 shows a Hilbert filter external to the carrier tracking loop, this is not required and, e.g., the Hilbert filter could have been shown and described as a part of the carrier tracking loop.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements may be implemented in a stored-program-controlled processor, e.g., a digital signal processor. Further, although shown as elements bundled within TV set 10, the elements therein may be distributed in different units in any combination thereof. For example, receiver 15 may be a part of a device, or box, physically separate from the device, or box, incorporating display 20, etc. It is therefore to be understood that numerous modifications may be made to the illustrative embodiments and that other arrangements may be devised without departing from the spirit and scope of the present invention as defined by the appended claims.

The invention claimed is:

1. Apparatus for use in detecting an interfering signal, the apparatus comprising:
 a carrier tracking loop for processing a received signal to provide a tracking signal indicative of a possible presence of at least one carrier of an interfering signal; and
 a decision device for determining if the interfering signal is present as a function of the tracking signal; wherein the decision device further comprises:
 a filter for averaging the tracking signal; and
 a comparator for comparing the averaged tracking signal to a predetermined threshold for determining if the interfering signal is present.

2. The apparatus of claim 1, further comprising a look-up-table for providing a D/U (Desired-to-Undesired) signal power ratio from the averaged tracking signal.

3. The apparatus of claim 2, wherein the D/U signal power ratio is defined as an average digital vestigial sideband ATSC (Advanced Television Systems Committee) signal power divided by an average NTSC (Nation Television System Committee) peak signal power.

4. The apparatus of claim 1, wherein the interfering signal is an NTSC (National Television Systems Committee) signal and the at least one carrier is an NTSC video carrier.

5. The apparatus of claim 1, wherein the interfering signal is an NTSC signal and the at least one carrier is an NTSC chroma carrier.

6. The apparatus of claim 1, wherein the interfering signal is an NTSC signal and the at least one carrier is an NTSC audio carrier.

7. The apparatus of claim 1, wherein the carrier tracking loop further comprises:
 a bandpass filter for filtering the received signal to provide a bandpass filtered signal, wherein the bandpass filter is centered about the at least one carrier;
 a delay/Hilbert filter for filtering the bandpass filtered signal to provide a complex signal; and
 a carrier tracking loop operative on the complex signal for providing the tracking signal.

8. The apparatus of claim 7, wherein the carrier tracking loop further comprises:
 a phase detector for processing the tracking signal to provide a phase offset signal indicative of a phase offset in the tracking signal;
 a loop filter for filtering the phase offset signal;
 a combiner for combining the loop filtered phase offset signal and a frequency offset signal to provide a combined signal, where the frequency offset signal is equal to a frequency of the at least one carrier signal;
 a numerically controlled oscillator responsive to the combined signal for providing a phase angle signal;
 a sine/cosine table for receiving the phase angle signal and for providing associated sine and cosine values; and
 a complex multiplier for multiplying the complex signal by the sine and cosine values provided by the sine/cosine table to provide the tracking signal.

9. A method for use in detecting an interfering signal, the method comprising:
 processing a received signal to provide a tracking signal indicative of a possible presence of at least one carrier of an interfering signal; and
 determining if the interfering signal is present as a function of the tracking signal; wherein the determining step includes the steps of:
 averaging the tracking signal; and
 comparing the averaged tracking signal to a predetermined threshold for determining if the interfering signal is present.

10. The method of claim 9, further comprising the step of providing a D/U (Desired-to-Undesired) signal power ratio from the averaged tracking signal.

11. The method of claim 10, wherein the D/U signal power ratio is defined as an average digital vestigial sideband ATSC (Advanced Television Systems Committee) signal power divided by an average NTSC (Nation Television System Committee) peak signal power.

12. The method of claim 9, wherein the interfering signal is an NTSC (National Television Systems Committee) signal and the at least one carrier is an NTSC video carrier.

13. The method of claim 9, wherein the interfering signal is an NTSC signal and the at least one carrier is an NTSC chroma carrier.

14. The method of claim 9, wherein the interfering signal is an NTSC signal and the at least one carrier is an NTSC audio carrier.

15. The method of claim 9, wherein the processing step includes the steps of:
 filtering the received signal to provide a bandpass filtered signal, wherein the bandpass filtered signal has a bandwidth centered about the at least one carrier;
 filtering the bandpass filtered signal to provide a complex signal; and
 processing the complex signal with a carrier tracking loop for providing the tracking signal.

16. The method of claim 15, wherein the processing the complex signal step includes the steps of:
 processing the tracking signal to provide a phase offset signal indicative of a phase offset in the tracking signal;
 filtering the phase offset signal to provide a filtered phase offset signal;
 combining the filtered phase offset signal and a frequency offset signal to provide a combined signal, where the frequency offset signal is equal to a frequency of the at least one carrier signal;
 processing the combined signal to provide a phase angle signal proportional to the frequency of the combined signal;
 providing sine and cosine values associated with the provided phase angle; and
 multiplying the complex signal by the provided sine and cosine values to provide the tracking signal.

17. The method of claim 9, further comprising the step of enabling a rejection filter for processing the received signal to remove the interfering signal when the interfering signal is determined to be present.

* * * * *